United States Patent
Yamashita et al.

[11] Patent Number: 6,074,970
[45] Date of Patent: Jun. 13, 2000

[54] DIELECTRIC CERAMIC COMPOSITION, MULTILAYER CERAMIC CAPACITOR AND PROCESS OF PRODUCING SAME

[75] Inventors: Yohashi Yamashita, Yokohama; Hideyuki Kanai, Kawasaki; Hironari Shoji, Ome; Yuichi Nakano, Fussa, all of Japan

[73] Assignees: Kabushiki Kaisha Toshiba, Kawasaki; Nippon Chemi-Con Corporation, Tokyo, both of Japan

[21] Appl. No.: 09/209,539

[22] Filed: Dec. 11, 1998

[30] Foreign Application Priority Data

Dec. 19, 1997 [JP] Japan ................................. 9-351186
Aug. 31, 1998 [JP] Japan ................................. 10-244603

[51] Int. Cl.$^7$ .......................... C04B 35/468; H01G 4/12
[52] U.S. Cl. ...................... 501/138; 264/615; 361/321.4
[58] Field of Search .......................... 501/138; 264/615; 361/321.4

[56] References Cited

U.S. PATENT DOCUMENTS

| | | | |
|---|---|---|---|
| 4,987,108 | 1/1991 | Takagi et al. | 501/138 |
| 5,248,640 | 9/1993 | Sano et al. | 501/137 |
| 5,264,402 | 11/1993 | Sano et al. | 501/137 |
| 5,510,305 | 4/1996 | Sano et al. | 501/138 |
| 5,646,080 | 7/1997 | Chu et al. | 501/137 |

FOREIGN PATENT DOCUMENTS

| | | |
|---|---|---|
| 47-35751 | 11/1972 | Japan. |
| 61-101459 | 5/1986 | Japan. |
| 61-250905 | 11/1986 | Japan. |
| 10-229028 | 8/1998 | Japan. |

*Primary Examiner*—David Brunsman
*Attorney, Agent, or Firm*—Price, Gess & Ubell

[57] ABSTRACT

A multilayer ceramic capacitor is produced by using a dielectric ceramic composition prepared by allowing a composition represented by the composition formula $(Ba_{1-x}Ca_x)TiO_3$ (provided that $0.005 \leq x \leq 0.05$), namely, 0.5–5 mol % to contain an additive of MnO—CoO—MgO at 0.2 to 2 mol % and a $Y_2O_3$ additive at 2.5 mol % or less and further adding a glass component comprising $SiO_2$—$Al_2O_3$—BaO—CaO—$Ta_2O_5$ at 0.5 to 5 mol % to the resulting composition. The dielectric ceramic composition can be prepared into slurry well by using an aqueous binder and can be sintered well with no occurrence of any crack even by fast firing, and even after barrel treatment, additionally, chipping hardly occurs in the dielectric ceramic composition. Accordingly, the resulting multilayer ceramic capacitor exerts an excellent breakdown voltage even at a large size and can therefore satisfy the JIS B characteristic.

23 Claims, 1 Drawing Sheet

DIELECTRIC CERAMIC COMPOSITION, MULTILAYER CERAMIC CAPACITOR AND PROCESS OF PRODUCING SAME

BACKGROUND OF THE INVENTION

The present invention relates to a dielectric ceramic composition for a multilayer ceramic capacitor (abbreviated as MLC hereinafter), the MLC using the composition and a process of producing the same. Particularly, the present invention relates to a technology for modifying the composition of a dielectric ceramic composition to improve the thermal efficiency and the mass productivity of the process of producing a capacitor.

Following the demand for downsizing an MLC with higher performance, in recent years, MLC of small size and large capacitance have increasingly been required, so that MLC of more than 200 layers have been developed. These MLCs have conventionally been produced by the wet stack process by means of screen printer or the dry stack process of laminating green sheets together. According to these processes, organic binders, plasticizers and organic solvents are mixed into a dielectric powder, to prepare a paste or a slurry, which is then dried to prepare a dielectric sheet.

According to these processes, however, a larger volume of organic solvents should be used, which causes difficulty in the control of the evaporation of the solvents and induces non-negligible influence over humans and environment. Hence, these processes have been drawing social concern from an environmental standpoint. According to the dry stack process, the use of films of polypropylene (abbreviated as PP) and polyethylene terephthalate(abbreviated as PET) following the progress in the preparation of thin-film dielectric sheets of 5 microns or less causes an issue against the disposal of the films. According to the wet stack process by means of screen printer, alternatively, no PET film is used, therefore involving no issue about film disposal. Nevertheless, it has been difficult principally according to the process, to produce a uniform dielectric sheet of a thickness below 5 microns and without any pinhole.

So as to overcome these problems of the conventional processes, the present inventors have already proposed a novel process where aqueous binders can be used (see Japanese Patent Application No. 9-033759).

MLCs have been fired conventionally by aligning green chips on a ceramics setter of zirconia and magnesia, followed by binder burn out around 300° C., elevating the temperature at a temperature rising rate of 50 to 200° C./hour up to around 1,300° C. by using a tunnel furnace and a batch furnace and retaining the temperature for several hours, and subsequently lowering the temperature at a temperature lowing rate of 50 to 200° C/hour for firing.

So as to improve the environmental problems about global warming, meanwhile, a process at a high thermal efficiency has been desired in recent years. For example, a proposal has been made about a process of temperature rising or temperature falling at a rate of 600° C. to 1,500° C./hour for the improvement of the thermal efficiency during MLC production to complete firing for a shorter period of time. Various setter materials have been suggested for the achievement of such fast firing, including metal base firing setters comprising platinum-, nichrome-, molybdenum-, and tungsten-based metals and materials produced by coating ceramics of zirconia and magnesia on the setters.

When dielectric materials for general use (for example, Japanese Patent Laid-open No. 47-035751 and Japanese Patent Application No. 59-220745 and No. 60-008999) are used for firing at a temperature rising rate or a temperature falling rate of 600 to 1,500° C./hour for a short period of time so as to improve the thermal efficiency for MLC production, disadvantageously, cracks readily emerge in the resulting elements after firing. The problem of the occurrence of cracking has been particularly noticeable during the production of large-type MLCs of a size of 5.0×5.7×2.0 mm and with an active dielectric layers of 5 microns or less.

For preparing a conventional barium titanate-based material satisfying the JIS B characteristic (a capasitance change at ±10% or less, −25° C. to +85° C.) into slurry during MLC production, additionally, the following problems have been remarked.

Regarding the aforementioned dielectric materials, first, binders of acrylic resins for general use readily cause slurry foaming and the occurrence of pinholes on green sheets, disadvantageously. When the resulting element is subjected to a wet barrel process for polishing the MLC corners, chipping also readily occurs, disadvantageously. These disadvantages are notable particularly when aqueous binders are used, which is a serious problem from the standpoint of mass production. Other than these disadvantages, additionally, a problem has been remarked, such that the breakdown voltage (BDV) is decreased below 200V, particularly when a large-size MLC of a 5.0×5.7×2.0 mm size and with a dielectric layer of 5 microns or less is to be produced.

The present invention has been proposed so as to overcome the problems of the prior art as described above. It is an object of the present invention to provide a dielectric ceramic composition preferable as a MLC, which can finely be slurried by using an aqueous binder and which can be sintered well with no occurrence of any crack therein even by fast firing and with rare occurrence of chipping therein after barrel treatment.

It is the other object of the present invention to provide a MLC capable of satisfying the JIS B characteristic including a high BDV even at a large size, greater performance and high reliability by using such composition, and to provide a method for producing a MLC at a high thermal efficiency and a great mass productivity and with sufficient environmental gentleness.

SUMMARY OF THE INVENTION

The present inventors have made investigations so as to attain the objects. Consequently, the inventors have found that the objects can be attained by using as a dielectric material a dielectric ceramic composition prepared by allowing a composition represented by the composition formula $(Ba_{1-x}Ca_x)TiO_3$ (provided that $0.005 \leq x \leq 0.05$) to contain an additive of MnO—CoO—MgO at 0.2 to 2 mol % and a $Y_2O_3$ additive at 2.5 mol % or less and further adding a glass component comprising $SiO_2$—$Al_2O_3$—BaO—CaO—$Ta_2O_5$ at 0.5 to 5 mol % to the resulting composition.

Such dielectric ceramic composition can be prepared into slurry by using an aqueous binder and can be sintered well with no occurrence of any crack even by fast firing. Herein, the ranges of the individual compositions are determined on the basis of the following reasons.

The reason why the range of Ca replacing Ba is set within a range of 0.5 to 5 mol % is as follows; below 0.5 mol % of Ca, it is difficult to prevent the decrease of the insulation resistance during firing in a reducing atmosphere, while above 5 mol % of Ca, adversely, it is difficult to maintain the temperature coefficient of capasitance (TCC) at the B characteristic while retaining the dielectric constant at 3,000 or more.

The reason why the additive of MnO—CoO—MgO is set at 0.2 to 2 mol % lies in that below 0.2 mol %, the prevention of the decrease of the insulation resistance during firing in a reducing atmosphere involves difficulty and additionally in that the dielectric loss at a dielectric layer thickness of 5 microns or less exceeds 3% and in that above 2 mol %, on contrast, the dielectric constant is then smaller than 3,000, which involves difficulty in preparing a small chip size with a high capacitance.

The reason why the $Y_2O_3$ additive is at 2.5 mol % or less is that the dielectric constant is then smaller than 3,000 and the temperature characteristic therefore cannot satisfy the B characteristic, if the additive is above 2.5 mol %.

The reason why the glass component of $SiO_2$—$Al_2O_3$—BaO—CaO—$Ta_2O_5$ is set at 0.5 to 5 mol % is as follows. If the glass component is below 0.5 mol %, the resulting composition can be firied at 1,300° C. or less with much difficulty and cracking readily occurs in the resulting chip at a firing profile of fast temperature rising and temperature falling above 600° C./hour. When an aqueous binder is used, furthermore, a greater volume of foam develops and pinholes additionally emerge in the resulting dielectric green sheet, which causes more chipping in barrel treatment after MLC firing. If the glass component is above 5 mol %, adversely, not only the dielectric constant is reduced but also the melt sticking between fired chips or the melt reaction between fired chips and zirconia or magnesia setters is enhanced.

Specific amounts of the individual components of MnO—CoO—MgO in the composition may appropriately be preset, but generally, preference is given to MnO=0.05 to 0.5 mol %, CoO=0.05 to 0.5 mol % and MgO=0.1 to 1.5 mol %. More particularly, the composition ratio of the additive is preferably MnO—CoO/MgO≧0.5.

In the other aspect of the present invention, an MLC is produced by alternately laminating together internal electrodes and a dielectric material by using the composition as the dielectric material to form an MLCs and firing the MLCs. The composition in accordance with the present invention can be prepared into slurry well by using an aqueous binder and can be fired well with no occurrence of cracking even by fast firing. Because fast firing can be carried out by using the composition, more specifically, the thermal efficiency can be improved, whereby the environmental gentleness can be enhanced and the occurrence of pinholes and chipping can be prevented to improve the electric performance.

DETAILED DESCRIPTION OF THE INVENTION

Figure 1:
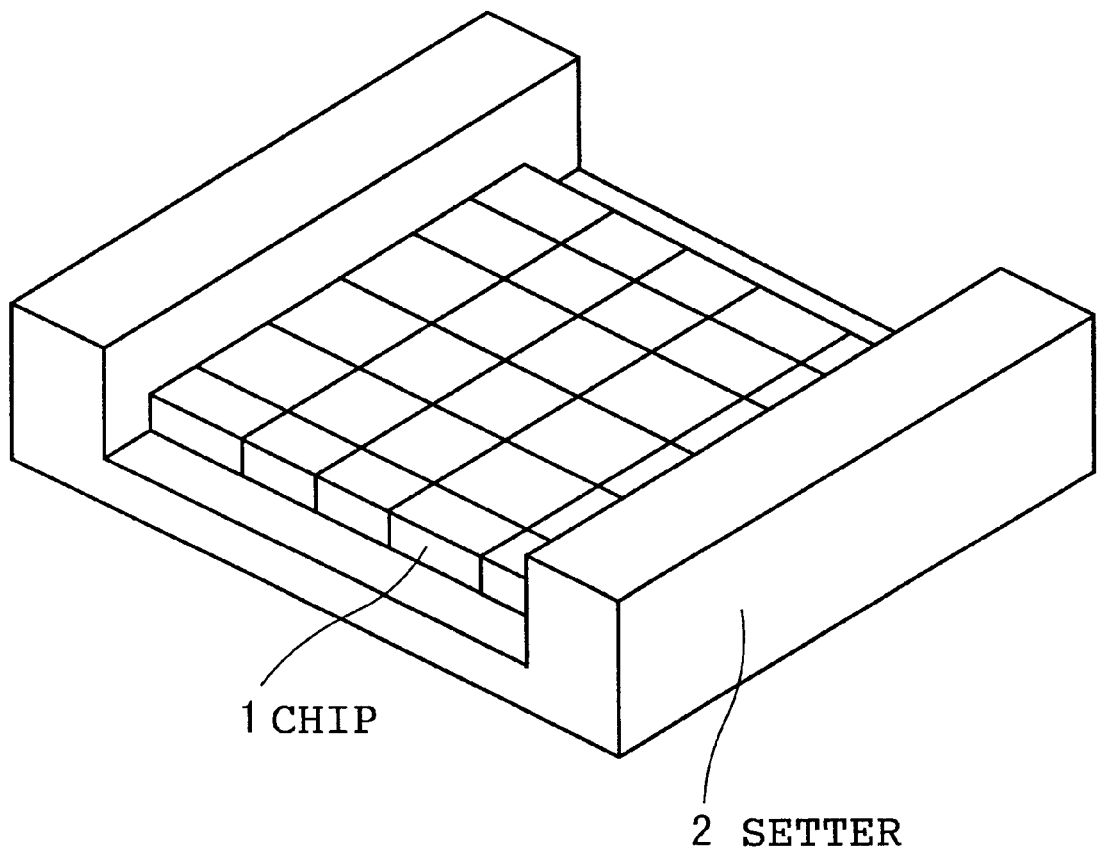
FIG. 1 depicts a schematic view of the assembly of chip 1 and setter 2 according to the process of producing the MLC in accordance with the present invention.

The mean particle size of the glass component and the specific amounts of the individual components of $SiO_2$—$Al_2O_3$—BaO—CaO—$Ta_2O_5$ may appropriately be preset, but generally, preference is given to $SiO_2$=0.5 to 3 mol %, $Al_2O_3$=0.05 to 0.5 mol %, BaO=0.5 to 2 mol %, CaO=0.5 to 2 mol % and $Ta_2O_5$=0.05 to 0.5 mol % and the mean particle size of the glass component is 0.5 micron or less.

Herein, the reason why the mean particle size of the glass component is limited to 0.5 micron or less lies in that an excellent MLC with a BDV of 400V or more can be realized by limiting the mean particle size of the glass component in such a manner, particularly when the dielectric layer is prepared as thinner than 5 microns. The reason why the amounts of $SiO_2$ and $Al_2O_3$ are limited to the aforementioned ranges resides in that outside the ranges, glass formation involves much difficulty; and the reason why the amounts of BaO and CaO are limited to the ranges lies in that the resulting dielectric constant is small outside the ranges.

Furthermore, the reason why the amount of $Ta_2O_5$ is limited to the aforementioned range is that if below 0.05 mol %, chipping occurs more frequently during barrel treatment and additionally, a sufficient BDV cannot be recovered, and that cracking occurs during fast firing. Above 0.5 mol %, adversely, the TCC cannot satisfy the B characteristic.

The glass component is preferably added to a calcined powder containing an additive of MnO—CoO—MgO at 0.2 to 2 mol % and a $Y_2O_3$ additive at 2.5 mol % or less in the preliminarily calcined essential component represented by the composition formula $(Ba_{1-x}Ca_x)TiO_3$ provided that $0.005 \leq x \leq 0.05$.

Within such composition ranges, a dielectric material with the well known JIS B characteristic can be produced readily at a firing temperature of 1,300° C. or less in a reducing atmosphere. More specifically, a dielectric material can be obtained, the material satisfying the essential properties required for a dielectric material with the JIS B characteristic, namely an insulation resistance larger than $10^{12}$ Ωcm, a smaller dielectric loss of 5% or less, excellent life performance at high-temperature loading and a large dielectric constant of 3,000 or more and still having the TCC of the B characteristic (within ±10%).

For producing the MLC, a dielectric slurry is first prepared by using the composition described above. By using an aqueous solvent as a dispersion medium, the composition can be slurried well, whereby foaming can be prevented, to thereby prevent the occurrence of pinholes and prevent the occurrence of chipping during barrel treatment after burning. Hence, the mass productivity can be elevated. Compared with the use of organic solvents, the environmental gentleness can be improved prominently.

On a green sheet prepared by using such a dielectric slurry as described above is then printed an internal electrode paste, to form an internal electrode layer and by subsequently laminating another green sheet thereon, a green bar is formed. In this case, Ni internal electrode layer may be formed on the green sheet layer, and by using Ni—Ta alloy internal electrode paste, more preferably, the reliability of the resulting capacitor can be improved. Further, at least two internal electrode layers comprising Ni and Ni—Ta may be formed. In any case, by adding 10% or less of Ta to Ni, an MLC with a dielectric layer of 3 microns or less and with a BDV of 250V or more can be prepared. From the respect of metal electrical resistivity, however, the amount of Ta added is preferably at 3% or less.

Then, the resulting MLC is fired in a reducing atmosphere at 1,200 to 1,300° C. and a partial oxygen pressure of $10^{-8}$ to $10^{-13}$ atm, which is subsequently thermally treated in an atmosphere at 600 to 1,100° C. and a partial oxygen pressure of $2 \times 10^{-1}$ to $1 \times 10^{-7}$ atm. By firing the composition in a reducing atmosphere at 1,300° C. or less in such manner, a dielectric layer with the JIS B characteristic can efficiently be produced, whereby an MLC with excellent electric properties can be prepared efficiently. Thus, the thermal efficiency and environmental softness can be enhanced.

For firing, preferably, the dielectric material is subjected to thermal treatment under conditions such that the resulting sintered grain size of the dielectric ceramic composition may be of a size of 0.2 to 2 microns. By limiting the grain size of the sintered ceramics to 0.2 to 2 microns, an MLC with a high BDV can be realized, particularly when the dielectric layer is thinner than 5 microns.

Preferably, the MLC is placed on a metal plate setter, at a temperature rising rate of 600 to 1,500° C./hour to 1,200 to 1,300° C., to leave the material as it is for several hours, and subsequently, the temperature of the material is lowered to ambient temperature at a temperature falling rate of 600 to 1,500° C./hour. By such fast firing, the thermal efficiency can be improved, whereby the environmental softness can be enhanced. The metal plate setter in this case is a metal plate containing any one of W, Mo, Pt, a Ni—Cr—Fe series, and a Fe—Cr—Co—Al series. More preferably, the top of the metal plate setter is coated with ceramics. By limiting the material of the metal plate setter or coating the top thereof with ceramics as described above, the deformation of the resulting metal plate setter or the occurrence of break due to sudden thermal impact during fast firing can be prevented. Thus, the dielectric material placed thereon can be fired well, to produce an excellent MLC.

Preferred Embodiments

The present invention will now be described hereinbelow in more detail with reference to specific examples of the present invention.

1. Production process

Preparation of dielectric slurry

For preparing a dielectric base material, firstly, individual materials of $BaTiO_3$, $CaTiO_3$, $(MgCO_3)_4 \cdot Mg(OH)_2 \cdot 5H_2O$, $MnCO_3$, and $Co_2O_3 \cdot Y_2O_3$ in powders of a particle size of 0.2 to 1 micron were weighed at their individually preset weights. By wet mixing together these materials with a ball mill for 16 hours and drying the resulting mixture by means of a spray dryer, the mixture was subjected to calcination at 1,000 to 1,200° C. for 2 hours. By subsequently grinding the resulting calcined material by means of a ball mill, a dielectric base material of an average particle size of 0.3 to 1.0 micron was obtained.

For preparing a glass component material, firstly, individual materials, namely $SiO_2$, $BaCO_3$, $CaCO_3$, $Al_2O_3$ and $Ta_2O_5$, were weighed at their individually preset weights. By placing these materials in a platinum crucible for melt fusion at 1,300° C. for 4 hours, the resulting fused product was then charged in water for glass formation. By subsequently using a grinder such as jet mill, a glass powder of an average particle size of 0.2 to 0.5 micron was prepared.

From the dielectric base material and the glass powder thus obtained were prepared plural dielectric raw materials with different mixing ratios of the individual materials. To 1,000 g each of the dielectric raw materials was placed 700 g of a solvent prepared by mixing together water, ethyl alcohol and a dispersant at a ratio of 80:19:1 (water:ethyl alcohol:the dispersant), to subsequently disperse the raw materials therein by means of a homogenizer. The mixture was subjected to fine dispersion by a well known general method by using a ball mill or an attrition mill for 20 hours, followed by addition of a solution containing an aqueous emulsion, an acrylic resin and a plasticizer, to prepare plural types of slurries. All the viscosities of these slurries were adjusted to about 200 cps.

Preparation of green chip

By using the resulting dielectric slurries, green sheets of thicknesses of 5 to 10 microns were prepared on PET films by a doctor blade system. An internal electrode paste was printed at a thickness of 2 microns on the green sheets. As the internal electrode paste, herein, use was made of a paste prepared by mixing together 100 parts by weight of a Ni particle of a mean particle size of 0.5 micron, 40 parts by weight of an organic vehicle (8 parts by weight of an ethyl cellulose resin dissolved in 92 parts by weight of butyl Carbitol) and 10 parts by weight of butyl Carbitol by means of a triple roll mill. After peeling off the sheets from the PET film and laminating the sheets together, then, the resulting laminated sheets were laminated together under pressure by using a static pressure of 1 ton at 80° C., to obtain a green chip. The number of active dielectric layers were 100.

Cutting and thermal treatment

As shown in FIG. 1, the resulting green chip was cut into pieces of a given size, and chip 1 was mounted on setter 2 of a Pt metal plate coated with zirconia, for continuously carrying out the following processes under the following conditions;

a) binder burn out process
b) firing and
c) annealing.

Thus, capacitor chips were prepared.

a) Binger burn out process

Temperature rising rate of 15° C./hour; retaining temperature at 280° C.; temperature retaining period of 8 hours; and air as atmospheric gas.

b) Firing

Temperature rising rate of 1,000° C./hour; keep temperature at 1,280° C.; temperature retaining period of 2 hours; cooling rate of 1,000° C./hour; a mixture gas of moistened $N_2$ and $H_2$ as atmospheric gas; and partial oxygen pressure of $10^{-12}$ atm (provided that the sample of Example 21 was fired at 1,240° C.).

c) Annealing

Retaining temperature at 1,000° C.; temperature retaining period of 8 hours; temperature rising and temperature falling rate of 600° C./hour; moistened $N_2$ gas as atmospheric gas; and partial oxygen pressure of $10^{-6}$ atm.

For a series of these procedures, furthermore, a wetter was used for moistening the individual atmospheric gases.

Barrel treatment and formation of termination electrode

After polishing the end face of the resulting capacitor chip by barrel treatment, a termination electrode paste was transferred on the both end of faces. As the termination electrode paste, herein, use was made of a paste prepared by mixing together 100 parts by weight of a Cu particle of a mean particle size of 0.5 micron, 35 parts by weight of an organic vehicle (8 parts by weight of an ethyl cellulose resin dissolved in 92 parts by weight of butyl Carbitol) and 7 parts by weight of butyl Carbitol. Subsequently, the capacitor chip was fired in a $N_2+H_2$ atmosphere at 800° C. for 10 minutes, to form termination electrodes to obtain a multilayer-type ceramics chip capacitor sample.

2. Comparison of performance due to the difference in the compositions of dielectric materials At the production process described above, samples of two sizes, namely 3.2×1.6 mm and 5.0×5.7 mm, were prepared. In these samples, the thickness of the effective dielectric layer was 5 microns; the number of lamination was 100 in layer; and the thickness of the internal electrode layer was about 1.5 microns. Table 1 below shows the compositions of the individual dielectric layers in the samples.

TABLE 1

|    | BaTiO$_3$ (mol %) | CaTiO$_3$ (mol %) | MnO (mol %) | CoO (mol %) | MgO (mol %) | Y$_2$O$_3$ (mol %) | SiO$_2$ (mol %) | Al$_2$O$_3$ (mol %) | BaO (mol %) | CaO (mol %) | Ta$_2$O$_5$ (mol %) |
|----|------|------|------|------|------|------|------|------|------|------|------|
| EX |      |      |      |      |      |      |      |      |      |      |      |
| 1  | 99   | 1    | 0.05 | 0.1  | 0.1  | 0    | 0.5  | 0.2  | 0.5  | 0.5  | 0.5  |
| 2  | 99   | 1    | 0.1  | 0.2  | 0.5  | 0.5  | 3    | 0.1  | 0.5  | 0.5  | 0.2  |
| 3  | 99.5 | 0.5  | 0.4  | 0.05 | 1.5  | 1    | 2    | 0.1  | 1    | 1    | 0.05 |
| 4  | 99   | 1    | 0.5  | 0.05 | 0.2  | 0.2  | 1    | 0.2  | 0.5  | 0.5  | 0.2  |
| 5  | 98   | 2    | 0.2  | 0.1  | 0.5  | 0.1  | 2    | 0.5  | 1    | 1    | 0.1  |
| 6  | 98   | 2    | 0.2  | 0.05 | 0.5  | 0.2  | 1.5  | 0.1  | 1.2  | 1    | 0.05 |
| 7  | 98   | 2    | 0.2  | 0.05 | 1    | 0    | 0.8  | 0.1  | 0.5  | 0.5  | 0.4  |
| 8  | 98   | 2    | 0.2  | 0.05 | 0.5  | 0.2  | 1    | 0.05 | 1    | 1    | 0.1  |
| 9  | 98   | 2    | 0.2  | 0.1  | 0.5  | 0.2  | 0.5  | 0.1  | 0.5  | 0.5  | 0.1  |
| 10 | 98   | 2    | 0.1  | 0.1  | 0.5  | 0.1  | 2    | 0.2  | 1.5  | 0.5  | 0.1  |
| 11 | 97   | 3    | 0.1  | 0.1  | 1.5  | 0.2  | 0.1  | 0.1  | 0.1  | 0.1  | 0.1  |
| 12 | 97   | 3    | 0.1  | 0.2  | 0.5  | 1    | 0.5  | 0.2  | 0.5  | 1    | 0.2  |
| 13 | 97   | 3    | 0.2  | 0.1  | 0.5  | 0.1  | 2    | 0.1  | 1    | 1    | 0.05 |
| 14 | 97   | 3    | 0.2  | 0.1  | 0.5  | 0.1  | 1.5  | 0.5  | 1    | 1    | 0.1  |
| 15 | 96   | 4    | 0.2  | 0.1  | 0.5  | 0    | 1    | 0.1  | 0.5  | 0.5  | 0.05 |
| 16 | 96   | 4    | 0.2  | 0.05 | 0.5  | 0.2  | 2    | 0.2  | 0.5  | 2    | 0.1  |
| 17 | 96   | 4    | 0.3  | 0.1  | 0.5  | 0.2  | 1.5  | 0.2  | 2    | 0.5  | 0.1  |
| 18 | 96   | 4    | 0.3  | 0.1  | 0.5  | 0.2  | 1    | 0.1  | 0.5  | 0.5  | 0.05 |
| 19 | 95   | 5    | 0.05 | 0.5  | 1    | 0.2  | 1    | 0.1  | 0.5  | 0.5  | 0.1  |
| 20 | 95   | 5    | 0.1  | 0.2  | 0.5  | 0.2  | 2    | 0.2  | 1    | 1    | 0.1  |
| 21 | 99   | 1    | 0.1  | 0.1  | 1.5  | 2.5  | 3    | 0.3  | 1    | 1    | 0.4  |
| REF EX |  |      |      |      |      |      |      |      |      |      |      |
| 1  | 90   | 10   | 0    | 0    | 0.05 | 0.2  | 1    | 0.5  | 0.5  | 0.5  | 0.2  |
| 2  | 98   | 2    | 1    | 1    | 4    | 0.5  | 1    | 0.1  | 0.5  | 0.5  | 0.1  |
| 3  | 98   | 2    | 0.5  | 0.2  | 0.5  | 3    | 1    | 0.2  | 0.5  | 0.5  | 0.5  |
| 4  | 98   | 2    | 0.2  | 0.05 | 1    | 0    | 0.8  | 0.1  | 0.5  | 0.5  | 0    |
| 5  | 100  | 0    | 0.2  | 0.05 | 0.5  | 0.2  | 1    | 0.05 | 1    | 1    | 0    |
| 6  | 100  | 0    | 0.1  | 0.2  | 0.5  | 0.2  | 0    | 0    | 0.5  | 0.5  | 0.1  |
| 7  | 98   | 2    | 0.2  | 1.05 | 0.5  | 0.2  | 1.5  | 0.1  | 3    | 3    | 0.2  |
| 8  | 99   | 1    | 0.1  | 0.1  | 1    | 0.5  | 1.2  | 0.5  | 1    | 1    | 1.5  |
| 9  | 98   | 2    | 1    | 1.5  | 0.1  | 0.2  | 1    | 1    | 1    | 1    | 0.2  |
| 10 | 98   | 2    | 0.5  | 0.5  | 0    | 0.1  | 0.1  | 1    | 1    | 1    | U    |

In Table 1, the Examples 1 through 21 have the compositions in accordance with the present invention, while the Reference Examples 1 through 10 have the compositions outside the scope of the present invention. Plural samples with such dielectric compositions as shown in Table 1 were individually subjected to a test of the appearance concerning green sheet pinhole, the crack number after firing, and the chipping number after barrel treatment, along with the measurement of TCC, dielectric constant, dielectric loss, BDV and insulation resistance. The results are shown in Table 2. The test and the measurement are described in more detail as follows.

a) Test of appearance

Green sheet was cut into pieces of 1 cm$^2$, which were subjected to microscopic observation at magnification ×50 to examine the existence or absence of pinhole. All the pinholes present were counted and the number thereof was recorded.

As to the number of cracks after firing, the number of the cracks in 20 samples for each composition was counted under visual observation.

As to the number of chipping after barrel, 20 samples for each composition were used. By placing an alumina ball of a 1-mm diameter and an alumina polishing agent No. 8 in a rotation barrel system, the samples were subjected to barrel treatment therein at 60 rpm for 3-hr rotation, to subsequently observe the defect of the edges to count the number of the occurrence of chipping in the 20 samples for each composition.

b) Temperature coefficient of capacitance (TCC)

It was assessed whether or not the capacity temperature characteristic satisfied the JIS B characteristic. More specifically, the capacitance was measured at −25 to 85° C. and at a measuring voltage of 1 V by using an LCR meter, to see whether or not the rate of TCC satisfied the range within +10% (at a basal temperature of 20° C.). The symbol "○" represents a case that the TCC satisfies the range, while the symbol "X" represents a case that the TCC does not satisfy the range.

c) Relative dielectric constants and dielectric loss

Capacitance was measured at 20° C., while the relative dielectric constant was measured on the basis of the electrode area and the thickness of the dielectric material.

d) Breakdown voltage(BDV)

By loading a voltage to an element, the voltage at which an electric current of 10 mA or more passed was defined as BDV. The voltage was measured five times for each composition, and the average thereof was calculated.

TABLE 2

| | SHEET PIN-HOLES | SAMPLE SIZE (mm) | NUMBER OF CRACKS AFTER BURNING | NUMBER OF CHIPPING AFTER BARREL TREATMENT | DIELECTRIC CONSTANT | CAPACITY TEMPERATURE CHARACTERISTIC B (JIS) | DIELECTRIC LOSS (%) | BDV (V) | INSULATION RESISTANCE (ΩF) @ 20° C. |
|---|---|---|---|---|---|---|---|---|---|
| EX | | | | | | | | | |
| 1 | NON | 3.2 × 1.6 | 0/20 | 0/20 | 3400 | ○ | 2.8 | 350 | 1600 |
| 2 | NON | 5.7 × 5.0 | 0/20 | 0/20 | 3100 | ○ | 2.4 | 310 | 1800 |
| 3 | NON | 3.2 × 1.6 | 0/20 | 0/20 | 3050 | ○ | 1.9 | 300 | 2400 |
| 4 | NON | 5.7 × 5.0 | 0/20 | 0/20 | 3090 | ○ | 1.8 | 315 | 2600 |
| 5 | NON | 3.2 × 1.6 | 0/20 | 0/20 | 3200 | ○ | 1.9 | 360 | 2800 |
| 6 | NON | 5.7 × 5.0 | 1/20 | 0/20 | 3200 | ○ | 1.9 | 300 | 3000 |
| 7 | NON | 3.2 × 1.6 | 0/20 | 0/20 | 3300 | ○ | 2.6 | 310 | 2900 |
| 8 | NON | 5.7 × 5.0 | 0/20 | 0/20 | 3400 | ○ | 2.2 | 340 | 2400 |
| 9 | NON | 3.2 × 1.6 | 0/20 | 0/20 | 3200 | ○ | 2.4 | 320 | 1800 |
| 10 | NON | 5.7 × 5.0 | 0/20 | 0/20 | 3070 | ○ | 2.4 | 370 | 2700 |
| 11 | NON | 3.2 × 1.6 | 0/20 | 0/20 | 3300 | ○ | 2.6 | 300 | 1800 |
| 12 | NON | 5.7 × 5.0 | 0/20 | 0/20 | 3200 | ○ | 2.3 | 300 | 1500 |
| 13 | NON | 3.2 × 1.6 | 0/20 | 0/20 | 3180 | ○ | 2.1 | 370 | 3200 |
| 14 | NON | 5.7 × 5.0 | 0/20 | 0/20 | 3240 | ○ | 2.1 | 340 | 3000 |
| 15 | NON | 3.2 × 1.6 | 0/20 | 0/20 | 3220 | ○ | 1.9 | 370 | 3300 |
| 16 | NON | 5.7 × 5.0 | 0/20 | 0/20 | 3200 | ○ | 1.9 | 360 | 2100 |
| 17 | NON | 3.2 × 1.6 | 0/20 | 0/20 | 3180 | ○ | 1.9 | 390 | 2200 |
| 18 | NON | 5.7 × 5.0 | 0/20 | 0/20 | 3260 | ○ | 1.8 | 320 | 2300 |
| 19 | NON | 3.2 × 1.6 | 0/20 | 0/20 | 3010 | ○ | 2.0 | 305 | 1700 |
| 20 | NON | 5.7 × 5.0 | 0/20 | 0/20 | 3000 | ○ | 2.7 | 370 | 2300 |
| 21 | NON | 5.7 × 5.0 | 0/20 | 0/20 | 3160 | ○ | 2.8 | 380 | 2900 |
| REF EX | | | | | | | | | |
| 1 | NON | 3.2 × 1.6 | 0/20 | 2/20 | 2400 | X | 4.0 | 290 | 300 |
| 2 | NON | 5.7 × 5.0 | 3/20 | 2/20 | 2200 | X | 5.0 | 260 | 140 |
| 3 | NON | 3.2 × 1.6 | 4/20 | 2/20 | 2100 | X | 3.8 | 280 | 10 |
| 4 | 2 EXIST | 5.7 × 5.0 | 8/20 | 6/20 | 3100 | ○ | 2.6 | 190 | 1000 |
| 5 | 3 EXIST | 3.2 × 1.6 | 4/20 | 8/20 | 3000 | ○ | 2.5 | 180 | 1400 |
| 6 | NON | 5.7 × 5.0 | 3/20 | 8/20 | 1600 | ○ | 4.6 | 220 | 50 |
| 7 | NON | 3.2 × 1.6 | 0/20 | 8/20 | 1100 | X | 6.6 | 90 | <1 |
| 8 | NON | 5.7 × 5.0 | 6/20 | 4/20 | 2100 | X | 3.2 | 50 | <1 |
| 9 | NON | 3.2 × 1.6 | 2/20 | 2/20 | 1700 | X | 6.3 | 120 | 250 |
| 10 | NON | 3.2 × 1.6 | 0/20 | 4/20 | 1100 | ○ | 6.6 | 110 | 40 |

As apparently shown in Table 2, the individual properties of the samples with the dielectric compositions in accordance with the present invention (Examples 1 through 21) are far more excellent than those of the samples with the dielectric compositions outside the range of the present invention (Reference Examples 1 through 10).

As apparently shown in the individual properties of Examples 1 through 21, more specifically, no cracking occurs in the elements with the dielectric compositions in accordance with the present invention under fast firing conditions such as temperature rising of 1,000° C./hour, or no chipping occurs therein after barrel treatment. Even if an aqueous binder is used for green sheet casting, the occurrence of pinholes is at an extremely low frequency, so that an MLC with great high BDV can be produced, irrespective of the large chip size.

3. Comparison of the properties due to the difference in internal electrode composition A Ni internal electrode and a Ni—Ta alloy internal electrode as in the samples recovered by the aforementioned process will now be compared and described hereinbelow.

For one example, a sample with the same dielectric composition as in Example 8 shown in Table 1 and with an internal electrode comprising a Ni metal with 1% Ta added thereto was defined as Example 22, and the properties thereof were evaluated as in Table 2. The results are shown below in Table 3.

In other words, Table 3 shows the individual properties of Example 8 wherein only the Ni metal was used and of Example 22 wherein the Ni metal with 1% Ta added thereto was used, and the two types of the samples of these Examples were of the same size and with the same dielectric composition in accordance with the present invention and were preliminarily produced under absolutely the same conditions, except for the difference in the metal composition for internal electrode.

TABLE 3

| EX | SHEET PIN-HOLES | SAMPLE SIZE (mm) | NUMBER OF CRACKS AFTER BURNING | NUMBER OF CHIPPING AFTER BARREL TREATMENT | DIELECTRIC CONSTANT | CAPACITY TEMPERATURE CHARACTERISTIC B (JIS) | DIELECTRIC LOSS (%) | BDV (V) | INSULATION RESISTANCE (ΩF) @ 20° C. |
|---|---|---|---|---|---|---|---|---|---|
| 8 | NON | 5.7 × 5.0 | 0/20 | 0/20 | 3400 | ○ | 2.2 | 340 | 2400 |
| 22 | NON | 5.7 × 5.0 | 0/20 | 0/20 | 3400 | ○ | 2.2 | 400 | 4000 |

As apparently shown in Table 3, the BDV and insulation resistance of Example 92 are prominently improved, compared with those of Example 8, which demonstrates that the BDV can be improved and even the insulation resistance can also be improved by using the Ni—Ta alloy rather than the use of Ni metal alone as the metal for internal electrode. At a high-temperature acceleration life test at 200° C. under the load of 50V, furthermore, the time required for the insulation resistance to be lowered to $10^6$ Ω or less was improved to 20 hours on average in Example 22, while in Example 8, the time was 10 hours on average. These results apparently indicate that the use of Ni—Ta alloy as the metal for internal electrode can improve various properties.

4. Comparison of properties due to the difference in binder

As the binder for slurrying the dielectric composition, an aqueous binder as in the case of the samples obtained at the production process described above and an organic solvent were used and compared, and the results are described below.

For one example, a sample with the same dielectric composition as in Example 8 shown in Table 1 was obtained by using an organic solvent and was defined as Example 23, and a sample with the same dielectric composition as in Reference Example 5 was obtained by using an organic solvent and was defined as Reference Example 11. The properties thereof concerning the items shown in Table 2 were evaluated. The results are shown below in Table 4.

In other words, Table 4 shows the individual properties of Example 8 as obtained by using an aqueous binder and the individual properties of Example 23 as obtained by using an organic solvent, the samples of these two types of the Examples being of the same size and with the same dielectric composition in accordance with the present invention and having been preliminarily produced under absolutely the same conditions except for the difference in binder. Table 4 also shows the individual properties of Reference Example 5, which was obtained by using an aqueous binder, and the individual properties of Reference Example 11, which was obtained by using an organic solvent, the samples of these two types of the Reference Examples being of the same size and with the same dielectric composition outside the scope of the present invention.

using the composition of the present invention, such excellent properties can be procured in a stable manner, irrespective of the types of the binders.

5. Other operations and advantages

At the production process, furthermore, the individual materials of $SiO_2$, $BaCO_3$, $CaCO_3$, $Al_2O_3$ and $Ta_2O_5$ in powder were used as the glass component materials in the dielectric material, and it is essential to add $Ta_2O_5$ as one glass component to the barium titanate material as the dielectric base material. By adding $Ta_2O_5$ thereto as described above, $Ta_2O_5$ can selectively be deposited in the grain boundary. For adding $Ta_2O_5$ to the barium titanate material as the dielectric base material, even if $Ta_2O_5$ is to be added in the other manner, such as a manner to be added as one additive, not as one glass component, the effect on the deposition of $Ta_2O_5$ is fairly low.

6. Other examples

The present invention is not limited to the examples, but variations and modifications of the examples may be carried out within the scope of the present invention. For example, the dielectric ceramic composition may selectively take an appropriate specific composition within the scope of the present invention. Furthermore, specific production process and specific conditions for the individual processes may appropriately be selected. For example, temperature conditions, temperature rising and lowering rate conditions, atmospheric gas conditions and others for the binder burn out, firing and annealing, may also be appropriately selected. With relation to these conditions, firing in a reducing atmosphere is described in the aforementioned Examples, but it is evident that similar properties can be procured in an oxidizing atmosphere.

Advantages of the Invention

In accordance with the present invention, as described above, a dielectric ceramic composition preferable as an MLC can be provided, having characteristics such that the dielectric ceramic composition can be slurried finely by using an aqueous binder; the composition can be sintered well with no occurrence of any crack by fast firing; and chipping hardly occurs therein after barrel treatment. By subsequently using such composition, an MLC with greater performance and high reliability can be provided, having

TABLE 4

| | SHEET PIN-HOLES | SAMPLE SIZE (mm) | NUMBER OF CRACKS AFTER BURNING | NUMBER OF CHIPPING AFTER BARREL TREATMENT | DIELECTRIC CONSTANT | CAPACITY TEMPERATURE CHARACTERISTIC B (JIS) | DIELECTRIC LOSS (%) | BDV (V) | INSULATION RESISTANCE (ΩF) @ 20° C. |
|---|---|---|---|---|---|---|---|---|---|
| EX | | | | | | | | | |
| 8 | NON | 5.7 × 5.0 | 0/20 | 0/20 | 3400 | ○ | 2.2 | 340 | 2400 |
| 23 | NON | 5.7 × 5.0 | 0/20 | 0/20 | 3450 | ○ | 2.2 | 350 | 2400 |
| REF EX | | | | | | | | | |
| 5 | 3 EXIST | 3.2 × 1.6 | 4/20 | 8/20 | 3000 | ○ | 2.5 | 180 | 1400 |
| 11 | 4 EXIST | 3.2 × 1.6 | 2/20 | 3/20 | 3100 | ○ | 2.2 | 230 | 1800 |

As apparently shown in Table 4, the properties of the sample of Example 23 as prepared by using an organic solvent are almost the same as those of the sample of Example 8 as prepared by using an aqueous binder. On contrast, in the Reference Examples 5 and 11 with the dielectric composition outside the scope of the present invention, the difference in these properties between the case of the use of an aqueous binder and the case of the use of an organic binder is large and additionally, the resulting properties are not satisfactory. Hence, it is demonstrated that by such an excellent BDV even at a large size that the capacitor can satisfy the JIS B characteristic.

Additionally, a method for producing such an excellent MLC at high thermal efficiency and great mass productivity and with environmental gentleness can be provided. According to such excellent method of the present invention, an MLC can be obtained, having excellent electric properties and being of a small size and exerting high performance at high reliability.

The present invention is particularly preferable for an MLC of a small size and in multilayer wherein the dielectric layer is thinner than 5 microns.

What is claimed is:

1. A dielectric ceramic composition prepared by allowing a composition represented by the composition formula $(Ba_{1-x}Ca_x)TiO_3$ (provided that $0.005 \leq x \leq 0.05$) to contain an additive of MnO—CoO—MgO at 0.2 to 2 mol % and a $Y_2O_3$ additive at 2.5 mol % or less and further adding a glass component comprising $SiO_2$—$Al_2O_3$—BaO—CaO—$Ta_2O_5$ at 0.5 to 5 mol % to the resulting composition.

2. A dielectric ceramic composition according to claim 1, wherein the individual components of the MnO—CoO—MgO in the composition are MnO=0.05 to 0.5 mol %, CoO=0.05 to 0.5 mol % and MgO=0.1 to 1.5 mol %.

3. A method for producing an MLC, comprising alternately laminating an internal electrode and a dielectric material together to form multilayer devices and firing the multilayer material, wherein said dielectric material is made of a composition selected from dielectric ceramic compositions according to claim 2.

4. A dielectric ceramic composition according to claim 1, wherein the individual components of $SiO_2$—$Al_2O_3$—BaO—CaO—$Ta_2O_5$ in the composition are SiO=0.5 to 3 mol %, $Al_2O_3$=0.05 to 0.5 mol %, BaO=0.5 to 2 mol %, CaO=0.5 to 2 mol %, and $Ta_2O_5$=0.05 to 0.5 mol % and the glass component comprising the $SiO_2$—$Al_2O_3$—BaO—CaO—$Ta_2O_5$ is of a mean particle size of 0.5 micron or less.

5. A method for producing an MLC, comprising alternately laminating an internal electrode and a dielectric material together to form multilayer devices and firing the multilayer material, wherein said dielectric material is made of a composition selected from dielectric ceramic compositions according to claim 4.

6. A method for producing an MLC, comprising alternately laminating an internal electrode and a dielectric material together to form a multilayer devices and firing the multilayer material, wherein said dielectric material is made of a composition selected from dielectric ceramic compositions according to claim 1.

7. A method for producing an MLC according to claim 6, comprising forming a multilayer material comprising the dielectric material of the composition and an internal electrode comprising Ni—Ta.

8. A multilayer ceramic capacitor produced by a method selected from methods according to claim 7.

9. A method for producing an MLC according to claim 6, comprising forming a multilayer material comprising the dielectric material of the composition and at least two internal electrode layers comprising Ni and Ni—Ta.

10. A multilayer ceramic capacitor produced by a method selected from methods according to claim 9.

11. A method for producing an MLC according to claim 6, comprising firing the multilayer material in a reducing atmosphere at 1,200 to 1,300° C. and a partial oxygen pressure of $10^{-8}$ to $10^{-13}$ atm and thereafter thermally treating the resulting multilayer material in an atmosphere at 600 to 1,100° C. and a partial oxygen pressure of $2\times10^{-1}$ to $1\times10^{-7}$ atm.

12. A multilayer ceramic capacitor produced by a method selected from methods according to claim 11.

13. A method for producing an MLC according to claim 6, comprising firing the muitilayer material under conditions such that the sintered grain size of the dielectric ceramic composition may be of 0.2 to 2 microns.

14. A multilayer ceramic capacitor produced by a method selected from methods according to claim 13.

15. A method for producing an MLC according to claim 6, wherein an aqueous solvent is used as a dispersing medium for slurrying the dielectric ceramic composition.

16. A multilayer ceramic capacitor produced by a method selected from methods according to claim 15.

17. A method for producing an MLC according to claim 6, comprising placing the multilayered material on a metal plate setter, elevating the temperature at a temperature rising rate of 600 to 1,500° C./hour to 1,200 to 1,300° C. and retaining the temperature for several hours and thereafter lowering the temperature at a temperature falling rate of 600 to 1,500° C./hour to ambient temperature.

18. A method for producing an MLC according to claim 17, wherein the metal plate setter contains at least one of W, Mo, Pt, a Ni—Cr—Fe series and a Fe—Cr—Co—Al series.

19. A multilayer ceramic capacitor produced by a method selected from methods according to claim 18.

20. A method for producing a MLC according to claim 17, wherein the metal plate setter contains at least one of W, Mo, Pt, a Ni—Cr—Fe series and a Fe—Cr—Co—Al series and the top of the setter is coated with ceramics.

21. A multilayer ceramic capacitor produced by a method selected from methods according to claim 20.

22. A multilayer ceramic capacitor produced by a method selected from methods according to claim 17.

23. A multilayer ceramic capacitor produced by a method selected from methods according to claim 6.

* * * * *